United States Patent
Ivkovich, Jr. et al.

[11] Patent Number: 6,165,600
[45] Date of Patent: Dec. 26, 2000

[54] GAS TURBINE ENGINE COMPONENT HAVING A THERMAL-INSULATING MULTILAYER CERAMIC COATING

[75] Inventors: Daniel P. Ivkovich, Jr., Fairfield; Andrew J. Skoog, West Chester; Jane A. Murphy, Middletown; Thomas W. Rentz, Cincinnati, all of Ohio

[73] Assignee: General Electric Company, Cincinnati, Ohio

[21] Appl. No.: 09/166,534

[22] Filed: Oct. 6, 1998

[51] Int. Cl.⁷ .................................. B32B 3/26; B64C 3/20
[52] U.S. Cl. ................. 428/213; 123/1 R; 244/35 R; 244/123; 428/218; 428/312.8; 428/316.6; 428/319.1
[58] Field of Search ................. 428/218, 312.8, 428/316.6, 319.1, 213; 123/1 R; 244/35 R, 123

[56] References Cited

U.S. PATENT DOCUMENTS

| | | | |
|---|---|---|---|
| 4,061,816 | 12/1977 | Kitamura | 428/18 |
| 4,552,800 | 11/1985 | Blasch et al. | 428/212 |
| 4,698,255 | 10/1987 | Pineau | 428/215 |
| 5,139,977 | 8/1992 | Dwivedi | 501/127 |
| 5,942,316 | 8/1999 | Lührsen et al. | 428/213 |

*Primary Examiner*—Blaine Copenheaver
*Attorney, Agent, or Firm*—Andrew C. Hess; David L. Narciso

[57] ABSTRACT

A method of forming a multilayer ceramic coating system on a substrate that requires thermal protection from a hostile thermal environment. The method generally entails forming at least one tape that contains ceramic particles dispersed in an organic constituent, such as a binder and/or plasticizer. If a single tape is used, the tape is formed of multiple layers of different compositions and applied as a unit to the substrate, thereby forming at least an innermost layer and an outermost layer on the substrate. If multiple tapes are used, a first tape is applied to the substrate to form the innermost layer, and a second tape is applied to form the outermost layer. The tape/tapes are then sintered to form innermost and outermost ceramic layers, respectively, on the substrate. The tape/tapes are formed and processed such that the innermost ceramic layer has submicron voids to provide a desired level of porosity, while the outermost ceramic layer is thinner, smoother and less porous than the innermost ceramic layer.

15 Claims, 1 Drawing Sheet

GAS TURBINE ENGINE COMPONENT HAVING A THERMAL-INSULATING MULTILAYER CERAMIC COATING

FIELD OF THE INVENTION

This invention relates to ceramic coatings of the type used to protect components exposed to high temperature environments, such as the hostile thermal environment of a gas turbine engine. More particularly, this invention is directed to a multilayer ceramic coating system that is built up on a substrate with one or more ceramic-containing tapes to produce an outermost ceramic layer with a smooth outer surface and at least one interior ceramic layer whose mechanical and physical properties are selected to provide a transition between the substrate and outer ceramic layer.

BACKGROUND OF THE INVENTION

Components located in certain sections of gas turbine engines, such as the turbine, combustor and augmentor, are often thermally insulated with a ceramic layer in order to reduce their service temperatures, which allows the engine to operate more efficiently at higher temperatures. These coatings, often referred to as thermal barrier coatings (TBC), must have low thermal conductivity, strongly adhere to the article, and remain adherent throughout many heating and cooling cycles.

Coating systems capable of satisfying the above requirements typically include a metallic bond coat that adheres the thermal-insulating ceramic layer to the component. Metal oxides, such as zirconia ($ZrO_2$) partially or fully stabilized by yttria ($Y_2O_3$), magnesia (MgO) or other oxides, have been widely employed as the material for the thermal-insulating ceramic layer. The ceramic layer is typically deposited by air plasma spraying (APS), low pressure plasma spraying (LPPS), or a physical vapor deposition (PVD) technique, such as electron beam physical vapor deposition (EBPVD) which yields a strain-tolerant columnar grain structure. Bond coats are typically formed of an oxidation-resistant diffusion coating such as a diffusion aluminide or platinum aluminide, or an oxidation-resistant alloy such as MCrAlY (where M is iron, cobalt and/or nickel). Aluminide coatings are distinguished from MCrAlY coatings, in that the former are intermetallics while the latter are metallic solid solutions.

While coating systems of the type described above are widely employed, the requirement that the coating system remain adherent throughout many heating and cooling cycles is particularly demanding because the coefficient of thermal expansion (CTE) of ceramic materials is significantly lower than those of the superalloys typically used to form turbine engine components. Such differences in CTE, in combination with oxidation of the underlying bond coat or substrate, eventually lead to spallation of the coating system.

An additional desired characteristic for a coating system of a gas turbine engine component is for the outermost surface of the coating system to be extremely smooth in order to promote the aerodynamics of the component surface. While relatively smooth ceramic coatings can be produced with spray methods such as those noted above, particularly with PVD techniques, smoother surface finishes would be desirable. In general, deposition techniques noted above tend to produce ceramic coatings that are relatively porous, which is advantageous in terms of achieving a low coefficient of thermal conduction. However, porosity promotes surface roughness—ceramic coatings deposited by PVD generally have surface roughnesses of about 60 $\mu$inch (about 1.5 $\mu$m) $R_a$ and higher, and those deposited by APS and LPPS typically have surface roughnesses of about 260 to 400 $\mu$inch (about 6.6 to 10.2 $\mu$m) $R_a$. Ceramic coatings deposited by conventional spray methods on components with complex geometries are further prone to such surface flaws as shadowing effects (thin or beaded regions caused by partial masking due to part shape) and slumping (thicker regions formed by movement of material to low portions of a part due to gravity).

In view of the above, it can be appreciated that there is an ongoing demand for gas turbine engine components that can be produced with adherent thermal barrier coatings having exterior surfaces that are denser and smoother for improved aerodynamical performance.

BRIEF SUMMARY OF THE INVENTION

The present invention generally provides a method for forming a ceramic coating on a substrate that requires thermal protection from a hostile thermal environment, such as the turbine, combustor and augmentor sections of a gas turbine engine. The method is particularly directed to producing a multilayer ceramic coating system whose outer surface is dense and smooth for improved aerodynamics, while the remainder of the coating system is more porous to promote the ability of the coating system to thermally insulate the component and provide a more uniform transition of mechanical and physical properties between the component surface and the dense surface of the coating system, thereby promoting the spallation resistance of the coating system.

The method of this invention generally entails forming at least two tape compositions that contain ceramic particles dispersed in an organic constituent, such as a binder and/or plasticizer. In one embodiment, a tape is formed of the first composition and then applied to the substrate to form an innermost tape layer on the substrate, after which at least one additional tape is formed of the second composition and then applied to form an outermost tape layer. The tapes are then processed (cured then sintered) to form innermost and outermost ceramic layers, respectively, on the substrate (along with any intermediate tapes that can be applied between the innermost and outermost tape layers to form intermediate ceramic layers upon curing and sintering). Alternatively, a single multilayer tape can be formed to contain both tape compositions, with the first tape composition forming a lower layer of the tape and the second composition forming the upper layer of the tape. After applying the tape to a substrate and then curing and sintering, the first and second compositions form innermost and outermost ceramic layers, respectively, on the substrate. This embodiment also permits the use of intermediate compositions to form intermediate layers within the tape and, subsequently, intermediate ceramic layers on the substrate.

According to the invention, the tape or tapes are formed and processed such that the innermost ceramic layer has submicron voids to provide a desired level of porosity, while the outermost ceramic layer is thinner, smoother and less porous than the innermost ceramic layer. As a result, this invention provides a multilayer ceramic coating system having a sintered inner ceramic layer whose porosity can be tailored to yield mechanical and physical properties that promote the adhesion of the coating system, and a denser and smoother sintered outer ceramic layer whose density and surface roughness can be tailored to promote the aerodynamic performance of the component on which the coating system is formed. Additional ceramic layers between the inner and outer layers can be formed if desired to further grade the transition between the substrate and coating surface. The result is a coating system that, as a whole, has a smooth aerodynamic surface, a low coefficient of thermal conductivity, and resists spalling throughout many heating and cooling cycles.

Other objects and advantages of this invention will be better appreciated from the following detailed description.

DETAILED DESCRIPTION OF THE INVENTION

Figure 1:
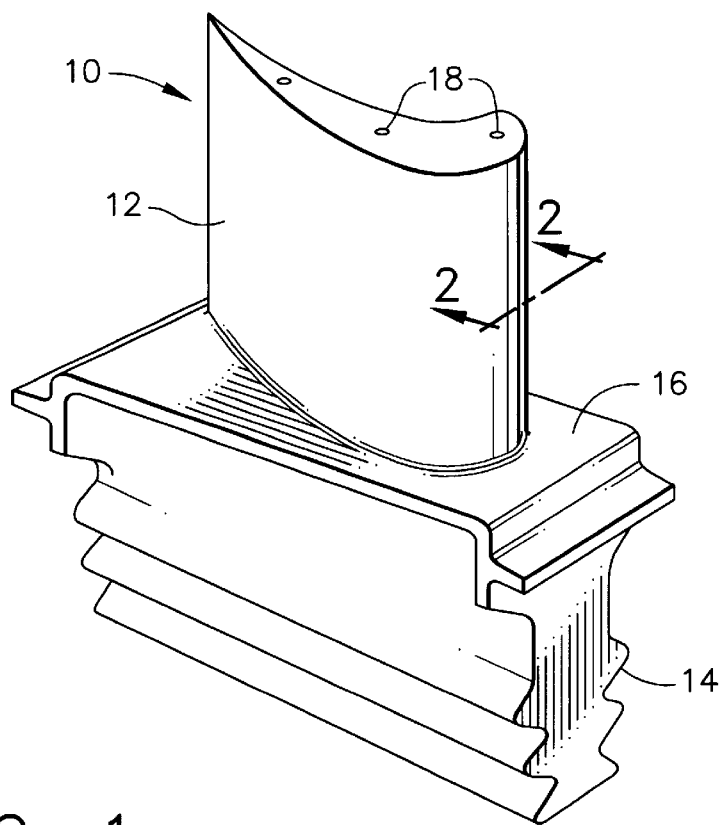
FIG. 1 is a perspective view of a high pressure turbine blade.

FIG. 1 shows a high pressure turbine blade 10 having an airfoil 12 against which hot combustion gases will be directed during operation of the gas turbine engine in which the blade 10 is installed. The airfoil 12 is anchored to a turbine disk (not shown) with a dovetail 14 formed on a root section 16 of the blade 10. Cooling passages 18 are present in the airfoil 12 through which bleed air is forced to dissipate heat from the blade 10. While the advantages of this invention will be described with reference to the high pressure turbine blade 10 shown in FIG. 1, the teachings of this invention are generally applicable to any component that operates within an environment characterized by relatively high temperatures, and is therefore subjected to severe thermal stresses and thermal cycling. The invention is particularly intended for high and low pressure turbine nozzles and blades, shrouds, combustor liners and augmentor hardware of gas turbine engines.

Figure 2:
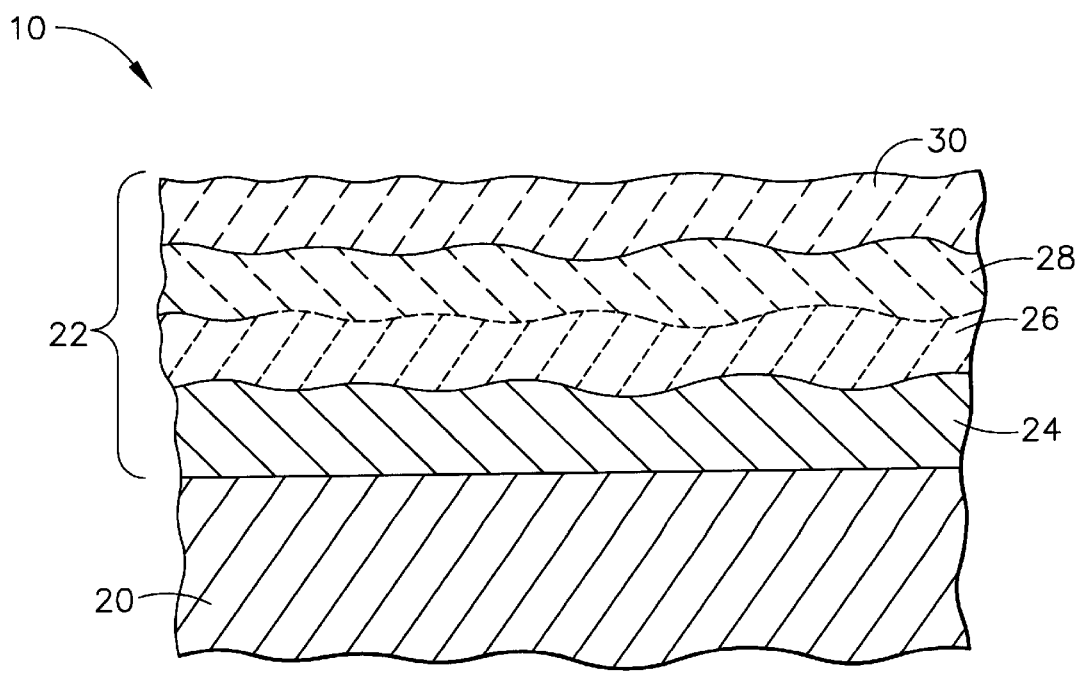
FIG. 2 is a cross-sectional view of the blade of FIG. 1 along line 2—2, and shows a coating system on the blade in accordance with an embodiment of this invention.

The blade 10 and its airfoil 12 are formed of a high-temperature material, typically an iron, nickel or cobalt-base superalloy. The surface of the airfoil 12 is thermally insulated from its hostile operating environment with a coating system 22 shown in FIG. 2. The coating system 22 is depicted as including three ceramic layers 26, 28 and 30 that are bonded to the blade substrate 20 with a metallic layer 24, such as an MCrAlY or diffusion aluminide bond coat, though the layer 24 could alternatively be an additional ceramic layer or entirely omitted. Depending on the application and component, the substrate 20 could be other than a superalloy, such as a ceramic, ceramic matrix composite, or metal matrix composite.

Contrary to prior art ceramic coatings deposited by such methods as air plasma spraying (APS), low pressure plasma spraying (LPPS) and physical vapor deposition (PVD) techniques such as electron beam physical vapor deposition (EBPVD), the ceramic layers 26, 28 and 30 are formed by one or more ceramic-containing tapes that are applied to the substrate 20 (or layer 24 if present), and then sintered to consolidate the ceramic component of the one or more tapes. According to the invention, the tape or tapes are formulated and processed to achieve different mechanical and physical properties for the layers 26, 28 and 30. Specifically, the innermost and middle ceramic layers 26 and 28 are formed and processed to provide thermal compatibility between the substrate 20 (or layer 24 if present) and the outermost ceramic layer 30, with the innermost ceramic layer 26 being particularly formulated for this purpose. The middle ceramic layer 28 may be omitted, in which case this role would be performed entirely by the ceramic layer 26. In contrast, the outermost layer 30 is formulated and processed to provide a dense and very smooth outer surface for the coating system 22, and therefore a more aerodynamic surface for the blade 10 than possible with prior art coatings deposited by spray deposition techniques.

The tape or tapes from which the ceramic layers 26, 28 and 30 are formed are preferably cast from compositions that contain metal oxide and/or glass particles in an organic matrix that preferably includes one or more binders and/or plasticizers. The innermost ceramic layer 26, and to a lesser extent the middle ceramic layer 28 (if present), is formulated to provide thermal expansion matching with the substrate 20 and the outermost ceramic layer 30. Controlling the thermal expansion characteristics of the ceramic layer 26 is chiefly performed by the use of predetermined blends of certain ceramic powders. The binders and/or plasticizers are intentionally selected and added in amounts that will create submicron voids in the ceramic layer 26 during sintering, which promote the compliance and thermal insulating effect of the ceramic layer 26. A preferred porosity for the ceramic layer 26 is at least 10% (based on weight), with a typical porosity being about 12%, though porosity can be tailored for the particular substrate material. A suitable thickness for the ceramic layer 26 is about 0.003 to 0.011 inch (about 75 to 300 micrometers), which typically requires a presintered thickness of about 0.005 to 0.015 inch (about 125 to 400 micrometers).

In contrast, the tape composition for the outermost ceramic layer 30 is formulated to yield a thinner, very dense ceramic layer that can be processed to have a very smooth surface, preferably a surface roughness of less than 20 $\mu$inches (about 0.5 $\mu$m) Ra, typically less than 8 $\mu$inches (about 0.2 $\mu$m), and a porosity of less than 10%. Importantly, the surface finish of the ceramic layer 30 made possible by this invention is beyond the capability of spray and PVD processes, and therefore distinguishes ceramic coatings of the present invention from the prior art. A suitable thickness for the ceramic layer 30 is about 0.001 to 0.004 inch (about 25 to 100 micrometers), which typically requires a presintered thickness of about 0.003 to 0.006 inch (about 75 to 150 micrometers).

The particular compositions for the ceramic layers 26, 28 and 30 can be varied in response to the compositions of the substrate 20 and layer 24 (if present), and the environment to which the outermost ceramic layer 30 will be subjected. Preferred ceramic constituents for the ceramic layers 26, 28 and 30 include alumina, zirconia, stabilized zirconia and silica. Preferred alumina powders include A-14 (an unground calcined alumina powder; ultimate particle size of 2 to 5 $\mu$m) and A-16SG (a super-ground thermally reactive alumina powder; ultimate particle size of 0.3 to 0.5 $\mu$m), both available from ALCOA, and SM8 (ultimate particle size of 0.15 $\mu$m) available from Baikowski International Corp. Silica can be provided in the form of glass frit or formed in situ during sintering from silicone, which can also serve as a binder prior to sintering. One or more of these ceramic constituents can be included in the tapes used to form the ceramic layers 26, 28 and 30. The inclusion of glass and silicon-based materials is desirable from the standpoint of improving the erosion resistance of the outermost ceramic layer 30. The particle size of the ceramic constituents can be varied, with a suitable particle size range being about 0.02 $\mu$inch (about 0.005 $\mu$m) to about 150 $\mu$inches (about 3.8 $\mu$m). Coarser particles (e.g., A-14) are preferred for the inner ceramic layers 26 and 28 to promote strain tolerance, and finer particles (e.g., A-16SG and SM8) are preferred for the outermost ceramic layer 30 to promote density and surface smoothness.

The remaining constituents for the tapes are organics, primarily binders and plasticizers that adhere the ceramic particles together to yield tapes that can be manipulated and applied to an irregular surface. Suitable binders include a polyvinyl butyral available under the name B-79 from Monsanto Co., and silicones available under the names SR355 and SR350 from the General Electric Company. Suitable plasticizers include dibutyl pthalate and the aforementioned B-79. A sufficient fraction of binders and plasticizers must be present to allow a tape to be applied and chemically or mechanically bonded to the intended substrate surface with the use of heat and pressure. Importantly, and as discussed above, the fraction of organics used in the layer that will form the innermost ceramic layer 26 must also be sufficient to ensure that submicron voids and proper oxide particle distribution will be produced during sintering to yield the desired porosity level for this layer 26. In contrast, the fraction of organics used in the tape that will form the outermost ceramic layer 30 must be sufficiently low, and yield properly sized oxides, to minimize porosity in this layer.

Broad ranges are stated in weight percents in Table I below for individual constituents that have been combined to produce the ceramic layers 26 and 30. Additional layers or tapes used to form intermediate layers (e.g., layer 28) will have composition ranges ween and overlapping those stated below.

TABLE I

| | TAPE COMPOSITION FOR: | |
|---|---|---|
| | INNERMOST LAYER | OUTERMOST LAYER |
| Reagent Alcohol | 5–75% | 5–75% |
| PS21A (surfactant) | 0–10 | 0–10 |
| A14 | 5–70 | 0–25 |
| SM8 | 5–70 | 0–25 |
| A16SG | 0–25 | 5–85 |
| SR355 (binder) | 3–35 | 3–35 |
| Dibutyl pthalate (binder) | 0.5–25 | 0.5–25 |
| B-79 (binder/plasticizer) | 1–50 | 1–50 |

Reagent alcohol is included as a solvent that facilitates the manufacture of the tapes, though other alcohols (e.g., methanol, isopropanol), aldehydes and ketone-base solvents could be used, depending on the system being considered. The solvent is evaporated from the tapes prior to application to the substrate 20 and sintering to form the ceramic layers 26, 28 and 30. PS21A is an alkyl organic phosphate ester acid surfactant commercially available from Whitco Chemical, and serves to promote wetting of the alumina particles. The amount of SR355 silicone binder indicated in Table I will yield silica particles in an amount of about 30 to about 40 weight percent of the original amount of SR355 silicone binder present in the tape composition. A like amount of the SR350 silicone binder is capable of yielding silica particles in an amount of about 60 to about 75 weight percent of the original amount of SR350 silicone binder present in the tape composition.

A suitable process for forming the coating system 22 of this invention involves casting the one or more tapes on a tetrafluoroethylene (i.e., TEFLON®) sheet. Compositions within the ranges defined above are applied to the TEFLON sheet and then dried for a duration sufficient to evaporate the solvent. The dried tapes are then removed from the TEFLON sheet and transferred to the component surface to be protected by the coating system 22. If multiple tapes are used, the tape formulated to produce the innermost ceramic layer 26 is applied first, followed by the tapes that form the ceramic layers 28 and 30. A more preferred process is to cast a single multilayer tape that contains at least one layer of each of the compositions of Table I, such that only a single tape application is required. As with the multiple tape approach, the single multilayer tape is applied to the substrate 20 so that the layer formulated to produce the innermost ceramic layer 26 contacts the substrate 20, and the layer formulated to yield the ceramic layer 30 is furthermost from the substrate 20. An advantage with using a single multilayer tape is that a lower binder content can be used, resulting in lower porosity of the ceramic layer 30.

Following tape application, pressure is preferably applied to the outer surface of the tape(s) through the use of a caul plate or other suitable means in order to produce the desired final surface finish and geometry for the outermost ceramic layer 30. A vacuum bag can then be used in conjunction with an autoclave to apply the heat and pressure required to chemically or mechanically bond the tape(s) to the substrate 20. The substrate 20, with the attached tape(s) forming an unsintered multilayer coating, is then sintered to consolidate and set the ceramic layers 26, 28 and 30. Sintering is performed at a sufficiently low temperature that will not adversely affect the desired properties for the substrate 20, but above the temperatures at which the binders and plasticizers will burn off and the ceramic particles form ceramic and glassy bonds. Thereafter, post processing operations can be performed to prepare the component for use.

The individual ceramic layers of the resulting coating system 22 will generally be micrographically discernible, and have morphologies that differ from sprayed ceramic layers. As previously noted, a further distinguishing characteristic of the coating system 22 of this invention is that its surface roughness (i.e., that of the outer ceramic layer 30) can be processed to be far better than that possible with conventionally-used deposition processes—generally 20 $\mu$m or less as compared to 60 $\mu$m or more for PVD coatings.

While our invention has been described in terms of a preferred embodiment, it is apparent that other forms could be adopted by one skilled in the art. Accordingly, the scope of our invention is to be limited only by the following claims.

What is claimed is:

1. A gas turbine engine component having a multilayer ceramic coating system on a surface thereof, the multilayer ceramic coating system having an exterior surface that is dense and smooth for improved aerodynamical performance, the multilayer ceramic coating system comprising:
    an innermost sintered ceramic layer on the component, the innermost sintered ceramic layer being formed of a first particulate material and having submicron voids therein; and
    an outermost sintered ceramic layer formed of a second particulate material that differs from the first particulate material, the outermost sintered ceramic layer having a surface roughness of less than 20 $\mu$inches Ra and being thinner, smoother and less porous than the innermost sintered ceramic layer.

2. A gas turbine engine component having a multilayer ceramic coating system as recited in claim 1, wherein the innermost sintered ceramic layer has a porosity of at least 10% and the outermost sintered ceramic layer has a porosity of less than 10%.

3. A gas turbine engine component having a multilayer ceramic coating system as recited in claim 1, wherein the innermost and outermost sintered ceramic layers comprise at least one material chosen from the group consisting of crystalline metal oxides and glasses.

4. A gas turbine engine component having a multilayer ceramic coating system as recited in claim 1, wherein the outermost sintered ceramic layer directly contacts the innermost sintered ceramic layer.

5. A gas turbine engine component having a multilayer ceramic coating system as recited in claim 1, wherein the first and second particulate materials comprise alumina powders.

6. A gas turbine engine component having a multilayer ceramic coating system as recited in claim 1, wherein the outermost sintered ceramic layer has a surface roughness of less than 8 $\mu$inches Ra.

7. A gas turbine engine component having a multilayer ceramic coating system as recited in claim 1, further comprising a bond coat on the surface of the gas turbine engine component, the innermost sintered ceramic layer directly contacting the bond coat.

8. A gas turbine engine component having a multilayer ceramic coating system as recited in claim 1, further comprising a ceramic coating on the surface of the gas turbine engine component, the innermost sintered ceramic layer directly contacting the ceramic coating.

9. A gas turbine engine airfoil component having a multilayer ceramic coating system on a surface thereof, the multilayer ceramic coating having an exterior surface that is dense and smooth for improved aerodynamical performance, the multilayer ceramic coating system comprising:

an innermost sintered ceramic layer on the airfoil component, the innermost sintered ceramic layer being formed of a first particulate material and having submicron voids therein, the innermost sintered ceramic layer having a porosity of at least 10%, the first particulate material being chosen from the group consisting of crystalline metal oxides and glasses; and an outermost sintered ceramic layer formed of a second particulate material different from the first particulate material, the outermost sintered ceramic layer having a surface roughness of less than 20 $\mu$inches Ra, a porosity of less than 10%, and being thinner and smoother than the innermost sintered ceramic layer.

10. A gas turbine engine airfoil component having a multilayer ceramic coating system as recited in claim 9, further comprising a sintered ceramic layer between the innermost and outermost sintered ceramic layers.

11. A gas turbine engine airfoil component having a multilayer ceramic coating system as recited in claim 9, wherein the outermost sintered ceramic layer directly contacts the innermost sintered ceramic layer.

12. A gas turbine engine airfoil component having a multilayer ceramic coating system as recited in claim 9, wherein the first and second particulate materials comprise alumina powders.

13. A gas turbine engine airfoil component having a multilayer ceramic coating system as recited in claim 9, wherein the outermost sintered ceramic layer has a surface roughness of less than 8 $\mu$inches Ra.

14. A gas turbine engine airfoil component having a multilayer ceramic coating system as recited in claim 9, further comprising a bond coat on the surface of the gas turbine engine airfoil component, the innermost sintered ceramic layer directly contacting the bond coat.

15. A gas turbine engine airfoil component having a multilayer ceramic coating system as recited in claim 9, further comprising a ceramic coating on the surface of the gas turbine engine airfoil component, the innermost sintered ceramic layer directly contacting the ceramic coating.

* * * * *